United States Patent
Bhatia et al.

(10) Patent No.: US 6,469,072 B1
(45) Date of Patent: *Oct. 22, 2002

(54) FINELY DISPERSED SHELL/CORE SOLID ADDITIVES IN POLYMERS AND PRODUCTS MADE THEREWITH

(75) Inventors: Qamar S. Bhatia, Stamford, CT (US); Paul Buckley, Scotia, NY (US); Gary Davis, Albany, NY (US); Robert L. Howe, Greenville, NY (US); Wie-Hin Pan, Evansville, IN (US); Elliott Shanklin, Altamont, NY (US)

(73) Assignee: General Electric Company, Schenectady, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 09/653,931

(22) Filed: Sep. 1, 2000

Related U.S. Application Data

(62) Division of application No. 09/406,154, filed on Sep. 27, 1999, now Pat. No. 6,160,038, which is a division of application No. 09/002,811, filed on Jan. 5, 1998, now Pat. No. 6,005,025, which is a division of application No. 08/609,238, filed on Mar. 1, 1996, now Pat. No. 5,773,493, which is a division of application No. 08/416,549, filed on Apr. 3, 1995, now Pat. No. 5,521,230, which is a continuation of application No. 08/153,016, filed on Nov. 15, 1993, now abandoned, which is a continuation of application No. 07/977,346, filed on Nov. 17, 1992, now abandoned.

(51) Int. Cl.[7] .............................. C08K 9/04; C08L 69/00
(52) U.S. Cl. ..................... 523/206; 523/207; 523/210; 524/462; 524/463; 524/520; 524/537; 524/539
(58) Field of Search ................................ 523/206, 207, 523/210; 524/462, 463, 520, 537, 539

(56) References Cited

U.S. PATENT DOCUMENTS

| | | | |
|---|---|---|---|
| 3,005,795 A | 10/1961 | Busse et al. | |
| 3,215,663 A | 11/1965 | Weisberg | |
| 3,294,871 A | 12/1966 | Schmitt et al. | |
| 3,334,154 A | 8/1967 | Kim | |
| 3,673,278 A | 6/1972 | Bialous | |
| 4,153,639 A | 5/1979 | Vaughn | |
| 4,649,168 A | 3/1987 | Kress et al. | |
| 4,753,994 A | * 6/1988 | Carter, Jr. et al. | |
| 4,772,655 A | 9/1988 | Krishnan et al. | |
| 4,826,900 A | 5/1989 | Ogoe et al. | |
| 5,030,667 A | * 7/1991 | Shimizu et al. | |
| 5,049,619 A | 9/1991 | Kyu | |
| 5,102,696 A | 4/1992 | Pan et al. | |
| 5,181,987 A | 1/1993 | Breuker et al. | |
| 5,196,507 A | 3/1993 | Totani et al. | |
| 5,208,275 A | * 5/1993 | Chatterjee | |
| 5,221,713 A | 6/1993 | Kempner et al. | |
| 5,274,010 A | 12/1993 | Burgnon et al. | |
| 5,298,537 A | 3/1994 | Vaidya | |
| 5,521,230 A | 5/1996 | Bhatia et al. | |
| 6,005,025 A | 12/1999 | Bhatia et al. | |
| 6,160,038 A | * 12/2000 | Bhatia et al. | |

FOREIGN PATENT DOCUMENTS

| | | |
|---|---|---|
| EP | A-0269950 | 6/1988 |
| EP | A-0598603 | 5/1994 |
| FR | A-890-326 | 11/1943 |
| FR | 1342434 | 9/1963 |
| GB | 1090975 | 11/1997 |
| JP | 0006551 | 3/1970 |

\* cited by examiner

*Primary Examiner*—Tae H. Yoon

(57) ABSTRACT

A method for dispersing solid forms of additives in polymers involves adding dispersions or solutions of additive(s) to a solution of polymer in a tubular mixer (preferably in the presence of a stationary mixer). The mixer leads to a steam precipitation step wherein all fluid ingredients in the mixture are volatilized leaving the solid additive and resin in the desired ratio. This results in a uniform dispersion of the additives in the polymer matrix. As a result of the high dispersion, physical properties of a thermoplastic resin, to which the polymer matrix has been added are preserved. In one illustration, PTFE as a drip inhibitor additive, is added to polycarbonate to obtain a highly dispersed PTFE concentrate of improved-drip-inhibition without loss of mechanical properties when added to a thermoplastic molding resin.

16 Claims, 1 Drawing Sheet

FINELY DISPERSED SHELL/CORE SOLID ADDITIVES IN POLYMERS AND PRODUCTS MADE THEREWITH

This is a divisional of prior application Ser. No. 09/406,154 filed on Sep. 27, 1999, now U.S. Pat. 6,160,038 which is a divisional of Ser. No. 09/002,811 filed on Jan. 5, 1998, issued U.S. Pat. No. 6,005,025 which is a divisional of application Ser. No. 08/609,238 filed on Mar. 1, 1996—issued U.S. Pat. No. 5,773,493, which is a divisional of Ser. No. 08/416,549 filed on Apr. 3, 1995, issued U.S. Pat. No. 5,521,230, which is a continuation of Ser. No. 08/153,016 filed on Nov. 15, 1993 now abandoned, which is a continuation of Ser. No. 07/977,346 filed on Nov. 17, 1992 now abandoned which is incorporated herein by reference.

BACKGROUND OF THE INVENTION

1. Field of The Invention

The invention relates to processes for dispersing solid additives in mixtures with synthetic, thermoplastic, polymer and to products prepared therewith. One embodiment concerns dispersing solid additives into particulated polycarbonates or blending the additives and particulated polycarbonates with other thermoplastic resins.

2. Brief Description of the Related Art

The patent literature is replete with descriptions of methods and processes for preparing homogeneous mixtures of synthetic polymeric resins with a wide variety of solid phase additives. Representative of such descriptions is that set forth in the U.S. Pat. No. 4,649,168 (Kress et al.) issued on Mar. 10, 1987. Kress et al. disperses particles of polytetrafluoroethylene (hereinafter referred to for convenience as "PTFE") in aromatic polycarbonate resin based molding compositions. The dispersion is carried out, in brief, by admixture of aqueous emulsions of the two components followed by coagulation of the emulsion mixture. Coagulation may be carried out by spray-drying, freeze-drying or the addition of inorganic or organic salts, acids, bases or organic solvents which are miscible with water.

The process described by Kress et al. does result in fine dispersions of the PTFE in the polycarbonate resin, but the degree of dispersion is dependent upon a number of variables, which require close control. For example, when two aqueous emulsions are mixed together, the way that these two emulsions will mix will be predominantly determined by the interactions of each of the suspended particulates with the water phase that they are emulsified with. This means that the surfactants necessarily used in each phase become dominant factors. During the process of coagulation, control of the dispersion of these two emulsions will become increasingly controlled by the interactions of the surfaces of the PTFE particle with the polymer resin particle. Since it is well known that like tends to repel like, there is an inherent driving force to cause segregation of these two mixed emulsions during coagulation.

Furthermore, when water is added to a resin powder the water becomes physically bound to and wets the surface of the powder. The amount of water that will be physically bound to this surface will be determined by the free energy characteristics of the powder surfaces, the amount of surface area available, and the free energy of interaction between water and this surface. Adding a water based emulsion of PTFE to an insufficiently wetted powder will result in the water immediately being stripped from the added emulsion, as long as the amount of water added is less than the saturation capability of the powder. This will result in an effective coagulation of the PTFE emulsion, because the emulsion cannot exist when the water is stripped from it. Since each particle of resin powder has a defined saturation potential for water, this will result in each resin powder particle only reacting with the water in a very small, defined amount of emulsion. This means that there is a forcing of coagulation of the PTFE emulsion on a distance scale determined by the water wetting characteristics of the resin powder. It also means that this will provide an extraordinary lack of dispersion of the PTFE because as soon as the surface of a particle of resin powder has been saturated or wetted out by water it no longer will have any capability to cause the coagulation of any more PTFE emulsion. This then becomes a physical limiting factor that will guarantee that the PTFE will be dispersed in the powder at a distance scale corresponding to the size of the PTFE emulsion size.

The process of the present invention is particularly advantageous in that the variables for controlling dispersion are limited. The process of our invention is simple, resulting in consistently good high dispersions on a scale not previously experienced. The highly homogeneous dispersions obtained produce products of a unique character and with superior properties. High proportions of additive are uniformly dispersed, without sacrificing mechanical properties. For example in regard to dispersing PTFE in polycarbonate resins, higher concentrations of the PTFE can be dispersed without difficulty and without compromising mechanical properties.

The process of the present invention incorporates PTFE into the particle structure of porous polycarbonate resins. Early processes for incorporating PTFE into polycarbonate resins included admixture and processing of the polycarbonate and the PTFE (in a latex) in a ball mill, a rubber mill, an extruder or a Banbury mixer; see for example the description in U.S. Pat. Nos. 3,294,871 and 3,290,795. In U.S. Pat. No. 3,005,795, it is suggested that admixture of the PTFE and the polycarbonate resin take place in "highly-fluid solutions and melts" of the base resin.

More recently, it has been found advantageous to combine the PTFE and a polycarbonate resin by co-precipitation of the two resins. This was said to result in the ultimate in dispersion of the PTFE into the polycarbonate resin; see the description in is the U.S. Pat. No. 4,753,994 (Carter, Jr. et al., issued Jun. 28, 1988).

In this teaching, an aqueous dispersion of PTFE is admixed with a solution of polycarbonate resin and caused to co-precipitate by the addition of an ester, aromatic hydrocarbon, aliphatic hydrocarbon, alcohol, carbonate, ether or ketone. The coprecipitate then needs to be isolated, washed and dried in a somewhat costly recovery.

However, these prior art processes do not yield products with the unique properties, especially in maintaining mechanical properties, associated with the products of our inventive process which is inherently simpler, less time consuming and less costly.

SUMMARY OF THE INVENTION

The invention comprises a process for incorporating a solid form of an additive in a highly dispersed manner into particles of a thermoplastic synthetic polymer, which comprises;

providing a fluid mixture of the additive;

providing a solution of the polymer resin;

admixing the additive mixture with the polymer resin solution; and removing the fluid and the solvent from the admixture simultaneously, whereby there is a co-precipitation of the additive and the polymer resin powder from the admixture.

The invention also comprises the thermoplastic composition products of the process of the invention, blends thereof with thermoplastic resins and articles molded therefrom.

DETAILED DESCRIPTION OF THE PREFERRED EMBODIMENTS OF THE INVENTION

Figure 1:
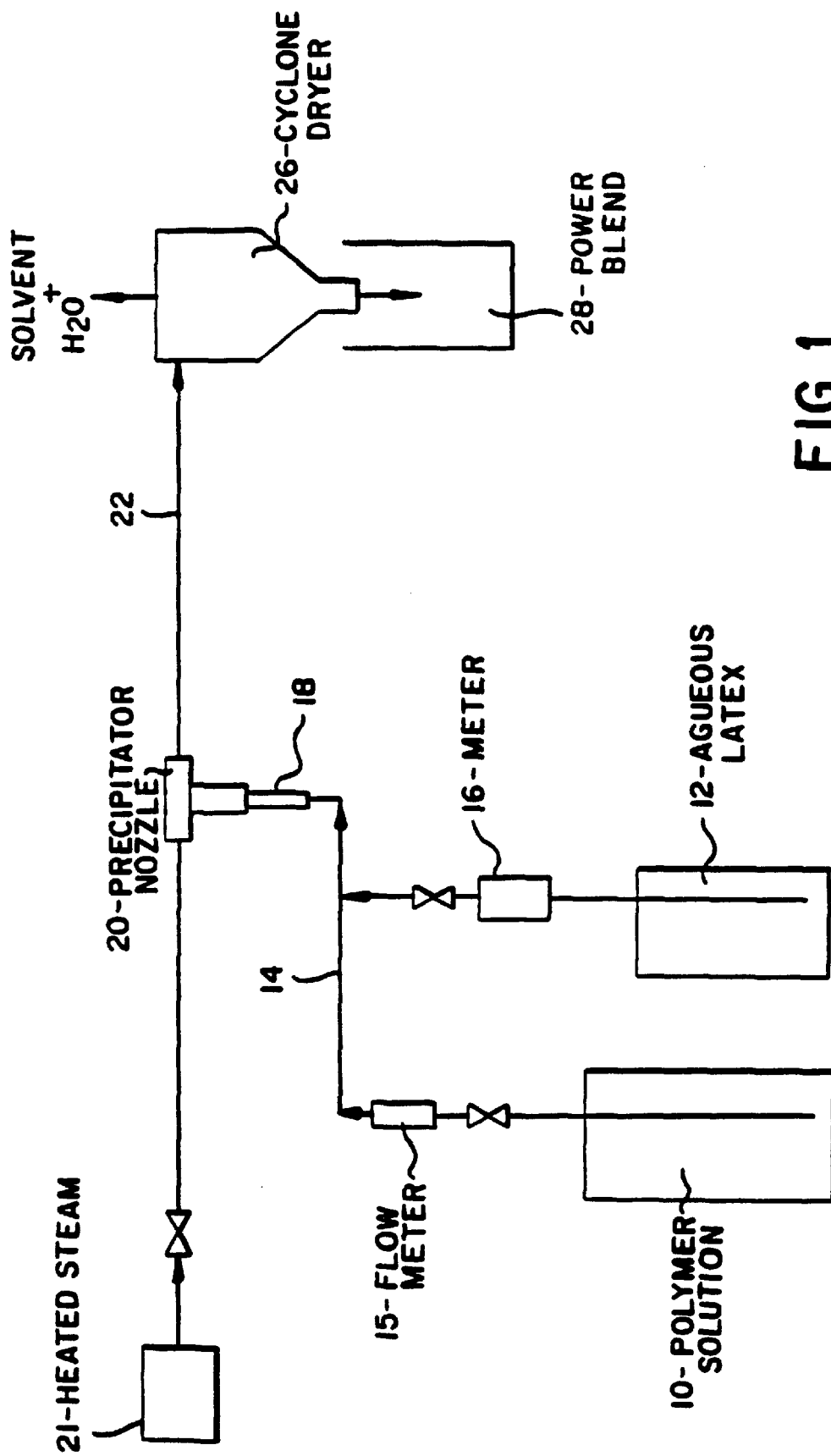
FIG. 1 depicts an apparatus used in Examples 1–4 to make the composition substantially as claimed.

The process of the invention may be employed to highly disperse solid additives in a wide variety of synthetic thermoplastic polymers. Representative of such polymers are organic polymers available in particle forms, characterized by chains of carbon atoms which may also contain polar groups as connecting links in the chains. Illustrative of such polymers are those of the general formula:

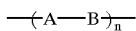

wherein n is an integer, greater than about So. A is a divalent hydrocarbon moiety having a formula selected from

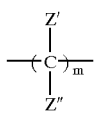

and

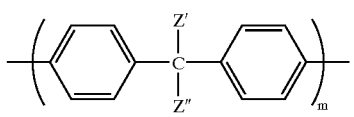

wherein m is an integer of between 1 and 20 and Z' and Z" are each selected from hydrogen and alkyl; and B is a divalent connecting link selected from radicals which are represented by the formulae:

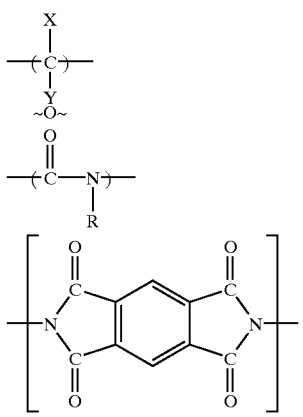

-continued

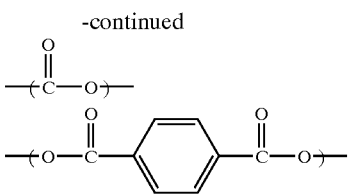

and

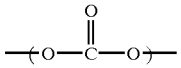

wherein X is selected from the group consisting of hydrogen, alkyl, aryl, and halogen, Y is selected from hydrogen, halogen, nitrile, carboxylate ester, alkoxy and acetal, and R is selected from hydrogen, alkyl, aryl, alkaryl, and alkoxymethyl. The thermoplastic polymers included within this definition include hydrocarbon polymers such as polyethylene, other polyolefins and copolymers of ethylene and 1-olefins, polystyrene, polyvinyl halides, polyvinylidene halides, polyacrylates, including inter alia polymethylmethacrylate, linear polycarbonamides made by the intermolecular polymerization of linear diamines containing from 6 to 10 carbon atoms and their amide-forming derivatives and the superpolyamides made by the intramolecular polymerization of omega-amino acids containing from 4 to 12 carbon atoms and their amide-forming derivatives, such as polyhexamethyleneadipamide, polyhexamethylenesebacamide, and polycaprolactam, polycarbonimides, polyethers, polycarbonates and polyoxyalkalenes, particularly high molecular weight, thermally-stable polyoxymethylene, polyphenylene ether, modified polyphenylene ether resins such as a blend of polyphenylene ether and a styrene polymer, blends of polycarbonate and acrylonitrile-butadine-styrene, polyalkylene terephthalates such as polyethylene terephthalate, polybutylene terephthalate, polypropylene terephthalate and blends thereof, polyetherimide esters, polyether esters, and blends thereof, and blends with the product prepared by the process of this invention, namely steam, co-precipitated PTFE and polycarbonate.

Although the process of the invention is applicable to the wide variety of thermoplastic polymers mentioned above, the remaining description will be confined to a discussion of aromatic polycarbonates as illustrative, for the purpose of convenience and simplicity. The process is particularly advantageous when used to process aromatic polycarbonates, including copolyester-carbonates.

Polycarbonates and copolyester-carbonates are well known polymers and are commercially available. Methods of preparing polycarbonates by interfacial polymer-ization are also well known; see for example the details provided in the U.S. Pat. Nos. 3,028,365; 3,334,154; 3,275,601; 3,915, 926; 3,030,331; 3,169,121; 3,027,814; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the referred processes typically involve dissolving or dispersing the diphenol reactants in aqueous caustic, adding the resulting mixture to a suitable water immiscible solvent medium and contacting the reactants with the carbonate precursor, such as phosgene, in the presence of a suitable catalyst and under controlled Ph conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing polycarbonate resins comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenols.

The dihydric phenols employed are known, and the reactive groups are the two phenolic hydroxyl groups. Some of the dihydric phenols are represented by the general formula:

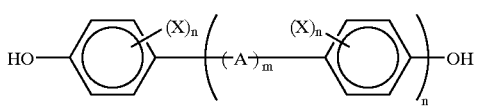
(I)

wherein A is a divalent hydrocarbon radical containing from 1 to about 15 carbon atoms; a substituted divalent hydrocarbon radical containing from 1 to about 15 carbon atoms and substituent groups such as halogen; —S—; —SS—; —S(O)—; —S(O)$_2$—; —O—: or —C—; each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and m is zero or 1 and n is an integer of from 0 to 4.

Typical of some of the dihydric phenols employed are bis-phenols such as bis(4-hydroxyphenyl)methane, 2,2-bis(4-hydroxyphenyl)propane (also known as bisphenol-A), 2,2-bis(4-hydroxy-3,5-dibromophenyl)-propane; dihydric phenol ethers such as bis(4-hydroxyphenyl)ether, bis(3,5-dichloro-4-hydroxy-phenyl)ether; dihydroxydiphenyls such as p,p'-dihydroxydiphenyl, 3,3'-dichloro-4,4, -dihydroxydiphenyl; dihydroxyaryl sulfones such as bis(4-hydroxyphenyl)sulfone, bis (3,5-dimethyl-4-hydroxyphenyl)sulfone, dihydroxybenzenes such as resorcinol, hydroquinone, halo- and alkylsubstituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxyphenyl)sulfoxide and bis(3,5-dibromo-4-hydroxyphenyl)sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)-propane, 2,2-bis(4-hydroxy-3,5-dichlorophenyl)-propane, hydroquinone, and the like, or bishaloformates of glycols such as bishaloformates of ethylene glycol, and the like. While all of the above carbonate precursors are useful, carbonyl chloride, also known as phosgene, is preferred.

Also included within the scope of polycarbonates are the high molecular weight thermoplastic randomly branched polycarbonates. These randomly branched polycarbonates are prepared by co-reacting a polyfunctional organic compound with the afore-described dihydric phenols and carbonate precursor. The polyfunctional organic compounds useful in making the branched polycarbonates are set forth in U.S. Pat. Nos. 3,635,895 and 4,001,184 which are incorporated herein by reference. These polyfunctional compounds are generally aromatic and contain at least three functional groups which are carboxyl, carboxylic anhydrides, phenols, halo-formyls or mixtures thereof. Some non-limiting be examples of these polyfunctional aromatic compounds include 1,1,1-tri(4-hydroxyphenyl) ethane, trimellitic anhydride, trimellitic acid, trimellitoyl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are 1,1,1-tri (4-hydroxyphenyl)ethane, trimellitic anhydride or trimellitic acid or their haloformyl derivatives. Also included herein are blends of a linear polycarbonate and a branched polycarbonate.

The polycarbonate treated in the process of the invention may be of relatively low weight average molecular weight or of relatively high weight average molecular weight ($M_W$). The lower $M_W$ resins are generally end-capped polycarbonates.

The so-called "end-capped" polycarbonates are prepared by the above-described procedures of producing aromatic carbonate polymers, wherein the reaction mixture includes small amounts of molecular weight regulators or chain terminators to provide end or terminal groups on the carbonate polymer and thereby control the molecular weight of the polycarbonate.

A molecular weight regulator, i.e.; a chain stopper, is generally added to the reactants prior to or during the contacting of them with the carbonate precursor. Useful molecular weight regulators include, but are not limited to, monohydric phenols such as phenol, chroman-I, paratertiarybutylphenol, p-cumylphenol and the like.

Other compounds that act as chain terminators for the carbonate polymers are also known. Thus, U.S. Pat. No. 3,085,992 discloses alkanol amines as chain terminators; U.S. Pat. No. 3,399,172 teaches imides as chain terminators; U.S. Pat. No. 3,275,601 discloses that aniline and methyl aniline function as chain terminators in the interfacial polymerization process for producing polycarbonates; and U.S. Pat. No. 4,011,184 discloses primary and secondary amines as molecular weight regulators for polycarbonate. Furthermore, U.S. Pat. No. 3,028,365 discloses that aromatic amines and other monofunctional compounds can be used to control or regulate the molecular weight of the polycarbonates, thereby forming aryl carbamate terminal groups. Aromatic polycarbonates having carbamate end groups are disclosed in U.S. Pat. No. 4,111,910. These polycarbonates are prepared using a terminating amount of ammonia, ammonium compounds, primary cycloalkyl, aliphatic or aralkyl amines and secondary cycloalkyl, alkyl or aralkyl amines.

As mentioned above the aromatic carbonate polymers treated by the process of the invention include polyestercarbonates, also known as copolyester-polycarbonates, i.e., resins which contain, in addition to recurring polycarbonate chain units of the formula:

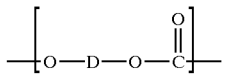
(IIa)

wherein D is a divalent aromatic radical of the dihydric phenol employed in the polymerization reaction, repeating or recurring carboxylate units, for example of the formula:

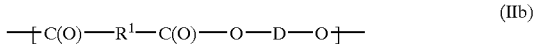
(IIb)

wherein D is as defined above and $R^1$ is as defined below.

The copolyester-polycarbonate resins are also prepared by interfacial polymerization technique, well known to those skilled in the art; see for example the U.S. Pat. Nos. 3,169,121 and 4,487,896.

In general the copolyester-polycarbonate resins are prepared as described above for the preparation of polycarbonate homopolymers, but by the added presence of a dicarboxylic acid (ester precursor) in the water immiscible solvent.

In general, any dicarboxylic acid conventionally used in the preparation of linear polyesters may be utilized in the preparation of the copolyester-carbonate resins. Generally, the dicarboxylic acids which may be utilized include the aliphatic dicarboxylic acids, the aromatic dicarboxylic acids, and the aliphatic-aromatic dicarboxylic acids. These acids are well known and are disclosed for example in U.S. Pat. No. 3,169,121 which is hereby incorporated herein by reference. Representative of such aromatic dicarboxylic acids are those represented by the general formula:

(III)

wherein $R^1$ represents an aromatic radical such as phenylene, naphthylene, biphenylene, substituted phenylene and the like; a divalent aliphatic-aromatic hydrocarbon radical such as an aralkyl or alkaryl radical; or two or more aromatic groups connected through non-aromatic linkages of the formula:

wherein E is a divatent alkylene or alkylidene group. E may also Consist of two or more alkylene or alkylidene groups, connected by a non-alkylene or alkylidene group, such as an aromatic linkage, a tertiary amino linkage, an ether linkage, a carbonyl linkage, a silicon-containing linkage, or by a sulfur-containing linkage such as sulfide, sulfoxide, sulfone and the like. In addition, E may be a cycloaliphatic group of five to seven carbon atoms, inclusive, (e.g. cyclopentyl, cyclohexyl), or a cycloalkylidene of five to seven carbon atoms, inclusive, such as cyclohexylidene. E may also be a carbon-free sulfur-containing linkage, such as sulfide, sulfoxide or sulfone; an ether linkage; a carbonyl group; a direct bond; a tertiary nitrogen group; or a silicon-contain linkage such as silane or siloxy. Other groups which E may represent will occur to those skilled in the art. For purposes of the present invention, the aromatic dicarboxylic acids are preferred. Thus, in the preferred aromatic difunctional carboxylic acids of the formula (III), $R^1$ is an aromatic radical such as phenylene, biphenylene, naphthylene, or substituted phenyiene. Some non-limiting examples of aromatic dicarboxylic acids which may be used in preparing the poly(ester-carbonate) or polyarylate resins of the instant invention include phthalic acid, isophthalic acid, terephthalic acid, homophthalic acid, o-, m-, and p-phenylenediacetic acid, and the polynuclear aromatic acids such as diphenyl dicarboxylic acid, and isomeric naphthalene dicarboxylic acids. The aromatics may be substituted with an inorganic atom such as chlorine, bromine, fluorine and the like; an organic group such as the nitro group; an organic group such as alkyl; or an oxy group such as alkoxy, it being only necessary that the group be inert to and unaffected by the reactants and the reaction conditions. Particularly useful aromatic dicarboxylic acids are those represented by the general formula:

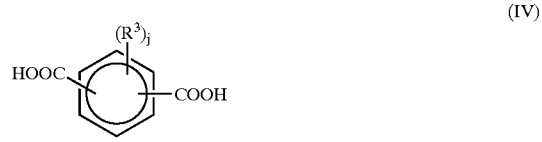
(IV)

wherein j is a positive whole integer having a value of from 0 to 4 inclusive; and each $R^3$ is independently selected from the group consisting of alkyl radicals, preferably lower alkyl (1 to about 6 carbon atoms).

Mixtures of these dicarboxylic acids may be employed. Therefore, where the term dicarboxylic acid is used herein it is to be understood that this term includes mixtures of two or more dicarboxylic acids.

Most preferred as aromatic dicarboxylic acids are isophthalic acid, terephthalic acid, and mixtures thereof.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using isophthalic acid, terephthalic acid or mixtures thereof, it is possible to employ isophthaloyl dichloride, terephthaloyl dichloride, and mixtures thereof.

The proportions of reactants employed to prepare the copolyester-carbonates will vary in accordance with the proposed use of the blends of the invention containing this product resin. Those skilled in the art are aware of useful proportions, as described in the U.S. patents referred to above. In general, the amount of the ester bonds may be from about 5 to about 90 mole percent, relative to the carbonate bonds. For example, 5 moles of bisphenol A reacting completely with 4 moles of isophthaloyl dichloride and 1 mole of phosgene would give a copolyester-carbonate of 80 mole percent ester bonds.

The process of the invention employs the organic polymer in solution. In the instance of a polycarbonate, the solvent mixture is advantageously a water immiscible solvent such as methylene chloride but any solvent for the resin may be employed. The concentration of polycarbonate in the solution is not critical, but may be within the range of from about 1 to about 25 weight percent (as an example).

A wide variety of solid forms of additives may be dispersed in the synthetic polymers by the process of the invention. These additives, which are generally conventionally used in the art of thermoplastics compounding, can include fillers (such as clay or talc), supplementary delustrants, impact modifiers, antistats, antioxidants, plasticizers, flow promoters and other processing aids, stabilizers, colorants, mold release agents, supplementary or synergistic flame retardants such as metal oxides, salts and the like, ultraviolet screening agents, and the like. The only requirement for an additive is that it can be provided as a solid dispersion, colloidal dispersion, or as a solution, for precipitation when the carrier or solvent, such as water, is removed.

Particularly useful in the process of the invention as applied to polycarbonates are additive fluoropolymers, i.e.; fluorinated polyolefins, provided in aqueous colloidal dispersion (latexes). The fluoropolymers function as a fire-retardant and drip-inhibitor when added to polycarbonate resin molding compositions.

The partially fluorinated polyolefins include, but are not limited to, poly(vinylidene fluoride), poly(vinyl fluoride), poly(trifluoroethylene), poly(chlorotrifluoroethylene) and poly(trifluoroethylene alkali metal sulfonate).

The fluorinated polyolefins which are most useful in the present invetion, as well as methods for their preparation, are described inter alia in Billmeyer, Fred W., Jr. Textbook of Polymer Science, Interscience Publishers, New York, N.Y., 1966, pp. 425–427; Monermoso, J. C., Rubber Chem. Tech., 34, 1521 (1961); and Rudner, M. A. Fluorocarbons, Reinhold Publishing Corp., New York, N.Y., and U.S. Pat. No. 4,663,391 which is incorporated herein by reference.

The polytetrafluoroethylene (PTFE) resin is preferred and preferably is of a fibrillar form for use in the process and compositions of this invention.

PTFE is a finely-divided powder or fluff as obtained from the preparative polymerization reaction. When a mass of this finely-divided, untreated polytetrafluoroethylene resin of average particle size 0.1 to 0.2 micron, such as that illustrated in FIGS. 1 and 2 of the article "Teflonl"; Tetrafluoroethylene Resin Dispersion by J. F. Lontz and W. B. Happoldt, Jr. in Ind. and Eng. Chem. vol. 44, p. 1800, 1952, is sheared by rubbing in the hands, the particles tend to stick together and form a coherent mass. If this mass is drawn out and examined with a microscope at 50–100X, it shows fibers of various sizes. Examination with an electron microscope shows that these fibers are bundles of smaller fibers, many of which consist of strings of the primary particles held together by very fine fibrils having diameters from one-fourth to one-tenth or less of the diameter of the particles. Polytetrafluoroethylene which has the ability of causing the particles to adhere and draw out into ultra fine fibrils when they are rubbed together with mechanical shearing, is preferred for use in the practice of this invention.

Microscopic examination of a product of the process of this invention reveals the presence of polymer encapsulated polytetrafluoroethylene particles (PTFE). This is believed to be the result of simultaneously removing the fluid and/or solvent from the admixture of thermoplastic polymer and additive such as PTFE. The resulting solid mixture shows the PTFE to be encapsulated by the thermoplastic polymer. If desired, the polytetrafluoroethylene particles can be given a micro-fibrous structure before incorporation in the base resin by subjecting them to high rates of shear when dispersed in suitable medium such as oil, or in a process such as water-cutting, whereby micro-fibers having diameters of less than 2 microns are obtained.

The amount of fluoropolymer which is incorporated into the polycarbonate by the process of the invention may be within the range of from about 0.01 to about 70% by weight, preferably from about 5 to about 40% and more preferably from about 15 to about 30% parts by weight.

The fluoropolymer is preferably used as an aqueous dispersion or latex thereof, the dispersed particles having a preferred size (diameter) of from 0.05 to 0.5 microns (average). Addition of poorly dispersed PTFE to polycarbonate resin molding compositions adversely affects many other physical properties of the articles molded from them. The properties that can be adversely affected include impact resistance and appearance. One of the primary adverse defects that can occur is due to the presence of poorly dispersed large PTFE particles. These poorly dispersed particles can 1). act as flaws to initiate crack propagation, 2). give poor impact resistance, 3). act as large optically opaque second phase particles that appear as black spec contamination when viewed in transmission, or 4). appear at the surface of a molded article as surface appearance defects. It is this last problem which apparently was solved by the method described by Kress et al., described above. However, the first three problems have remained as difficulties in the art, until the present process was discovered.

We have discovered a process of introducing PTFE into polycarbonate resin molding compositions, which advantageously results in articles molded therefrom having defect-free surfaces and improved mechanical flammability characteristics. The method accomplishes the advantages, apparently, by encapsulating the PTFE with the polymer composition, while forming relatively small and uniform particles of both polymer and additive. The resulting polymer-additive compositions are concentrates useful when blended with polycarbonate resin molding compositions as a fire-retarding, drip-inhibiting additive, or with any other polymeric molding composition as for example hydrocarbon polymers such as polyethylene, other polyolefins and copolymers of ethylene and 1-olefins, polystyrene, polyvinyl halides, polyvinylidene halides, polyacrylates, including inter alia polymethylmethacrylate, linear polycarbonamides made by the intermolecular polymerization of linear diamines containing from 6 to 10 carbon atoms and their amide-forming derivatives and the superpolyamides made by the intramolecular polymerization of omega-amino acids containing from 4 to 12 carbon atoms and their amide-forming derivatives, such as polyhexamethyleneadipamide, polyhexamethyl-enesebacamide, and polycaprolactam, polycarbonimides, polyethers, polycarbonates and polyoxyalkalenes, particularly high molecular weight, thermally-stable polyoxymethylene, polyphenylene ether, modified polyphenylene ether resins such as a blend of polyphenylene ether and a styrene polymer, blends of polycarbonate and acrylonitrile-butadine-styrene, polyalkylene terephthalates such as polyethylene terephthalate, polybutylene terephthalate, polypropylene terephthalate and blends thereof, polyetherimide-esters, polyether-esters, and blends thereof, and blends with the product prepared by the process of this invention, namely steam, co-precipitated PTFE and polycarbonate. as can be seen from the Examples of this invention, the concentrate consisting of the additive and thermoplastic resin co-precipitated together does not adversely affect the impact or other properties of the molding composition to which the concentrate is added.

In accordance with the process of the invention, the two components, i.e., fluids containing the polycarbonate and separately the fluoropolymer are mixed together for example, in a continuous tubular mixer optionally equipped with a static mixer at ambient or elevated temperatures.

The rate at which the two fluids are brought in contact with each other is not critical to the process of the invention. However, the rate at which the two components are brought in contact with each other is advantageously at a substantially uniform rate over a given period of time. One advantageously avoids a "dumping" of the fluoropolymer into the polycarbonate, but instead seeks to achieve a metering of the fluoropolymer into the polycarbonate, to obtain a homogeneous mixture. The proportions of the two components may be in a weight ratio of from 70:30 to 0.01:99.99 (PTFE:polymer resin), preferably 40:60 to 5:95 and most preferably 30:70 to 15:85.

After admixture of the two fluid streams, co-precipitation of the polymer and the additive is effected by simultaneous removal of the carrier for the additive and the solvent for the polymer. This may be accomplished by volatilization of both the carrier for the additive (such as water) and the solvent for the polymer (such as an organic solvent). Volatilization can be achieved by subjecting the mixture to spray drying, to achieve a dryness of about 1.0 percent or less of moisture.

Devices for spray drying fluid dispersions of solid particles are generally well known; see for example the sprayers described in the U.S. Pat. Nos. 1,140,453; 2,249,359; 2,325,112; 2,647,796; 3,452,931; 3,581,997, and 3,901,449. Both compressed air operated sprayer devices or the "airless" spray devices may be used. In general, it is advantageous to employ the air-driven type of sprayer for relatively dilute fluoropolymer latexes (less than 30 percent solids content). Higher solids contents are preferably sprayed from the airless sprayers.

In a preferred embodiment process of the invention, co-precipitation of the polymer and the additive is carried out by steam precipitation, i.e.; simultaneous removal of water and solvent by injection and release of steam into the mixture of ingredients, to achieve volatilization.

The invention will be better understood with reference to the following preparations and examples, which are presented for purposes of illustration rather than for limitation, and which set forth the best mode contemplated for carrying out the invention.

Where reported, the following test procedures were followed:

Notched Izod (NI)

Impact on 125 mil thick molded samples was determined according to ASTM D-256; all specimens were 100% ductile at failure, unless otherwise noted.

Flammability

Determined in accordance with the UL-94 5VA and UL-94 5VB method of Underwriter's Laboratory. Briefly, the procedures are 94-5VA and 94-5VB wherein the specimen that does not exhibit burn through (hole) is classified as 94-5VA and the specimen that exhibits burn through (hole) is classified as 94-5VB. Procedure 94-5VA is a bar specimen and procedure 94-5VB is a plaque specimen.

Ductility Dynatup

Dynatup impact measurements were made in a Dynatup autoloader machine using 125 mil thick by 10.16 cm discs. The tup impact velocity was 12.2 ft/sec giving an impact energy of 148 ft-lb. The average energy to maximum load of three measurements was reported.

Tensile Tests

Tensile break and tensile elongation were determined in accordance with ASTM D-638.

All parts are by weight unless otherwise stated. The term "phr" means parts per hundred of resin.

EXAMPLES 1–4 and CONTROL

With reference to the accompanying drawing, a number of preparations are carried out to add PTFE (as a drip inhibitor) to a polycarbonate (Lexan® 125, a homopolymer prepared by phosgenation of bisphenol-A, General Electric Company, Mount Vernon, Indiana, U.S.A., having an intrinsic viscosity of from about 0.4 to 0.5 deciliters/gram).

The PTFE is added as a 60% PTFE aqueous latex supplied by ICI as Fluon AD-1. The polycarbonate is in the form of a 10% methylene chloride solution. The PTFE latex and polycarbonate solution are metered in concurrently from pressurized stainless steel vessels 10, 12 into the tubular mixer 14 as shown in the drawing. The polycarbonate solution was added at 1.5L per min. through flow meter 15 and the PTFE latex was added through meter 16 at a rate to give between 5 and 25 wt percent PTFE in the polycarbonate solution. The fluid streams were mixed in a multielement stationary mixer 18. The mixed fluids then enter a steam precipitation nozzle 20 where high pressure super heated steam (80 psi) is added at a rate of 80 lbs/hr. from source 21. The high pressure (live) steam simultaneously vaporizes methylene chloride solvent and water carrier and the polycarbonate encapsulates the PTFE as they coprecipitate in conduit 22 where particle formation is completed to obtain a PTFE/polycarbonate concentrate. By this mode of coprecipitation, particle size ranging from 5 micron to 5 millimeter is typical and acceptable for this inventive process. A cyclone separator 26 then separates the concentrate powder from the bulk of the water and methylene chloride vapors. The precipitated powder is vacuum dried in a dryer 28 at 100®C and 60 mm Hg for 48 hrs. to obtain a free-flowing powder with less than 1% moisture. It will be seen that separation and clean-up of the desired product is relatively simple and easy to carry out.

Two PTFE concentrates at PTFE loadings of 24% and 8% by weight were prepared. Each sample was used as a flame-retarding, drip-inhibiting additive in polycarbonate molding formulations in order to evaluate the influence of the PTFE on physical properties and flame retardant performance. The following Table I summarizes the formulations made. The formulations as shown in the Table I were blended, extruded and thermoplastically molded into test parts under the same molding conditions. Test results observed from molded parts are also given in the Table I. Also included is a control formulation which uses the PTFE concentrate prepared by adding PTFE latex to polycarbonate powder followed by blending and drying without coprecipitation by volatilization of fluids with steam. By this latter method, the PTFE has been found to be poorly dispersed in comparison to the products of the process of the invention and this poor dispersion is reflected in the physical properties of articles molded.

TABLE I

|  | Examples | | | | |
| --- | --- | --- | --- | --- | --- |
| Formulation (% by wt) | 1 | 2 | 3 | 4 | Control |
| Lexan ® 125, supra | 96.5 | 99.05 | 89.53 | 97.0 | 98.0 |
| SPTFE/PC concentrate | 3.5 | 1.0 | | | |
|  | (0.84/2.68) | (0.24/0.76) | | | |

TABLE I-continued

|  | Examples | | | | |
| --- | --- | --- | --- | --- | --- |
| Formulation (% by wt) | 1 | 2 | 3 | 4 | Control |
| SPTFE/PC concentrate |  |  | 10.5 (0.84/9.66) | 3.0 (0.24/2.76) |  |
| PTFE/PC blend |  |  |  |  | 2.0 (0.4/1.6) |
| Mold release agent (phr) | 0.3 | 0.3 | 0.3 | 0.3 | 0.3 |
| KSS (A) (phr) | 0.05 | 0.05 | 0.05 | 0.05 | 0.05 |
| Test Results |  |  |  |  |  |
| NI (kg/cm$^2$) | 1.08 | 1.02 | 1.08 | 0.98 | 1.00 |
| (% ductility) | 100 | 100 | 100 | 100 | 100 |
| Dynatup (kg/cm$^2$) | 2.81 | 2.96 | 3.02 | 2.96 | 2.39 |
| (% ductility) | 100 | 100 | 100 | 100 | 100 |
| Tensile Elongation (%) | 104 | 105 | 109 | 96 | 63 |
| UL94 5V (3.2 mm) | pass | fail | pass | fail | fail |

(A) Potassium salt of diphenylsulfone sulfonate, a fire retarding additive.
SPTF/PC - steam precipitated PTFE and polycarbonate
SPTFE/PC - mechanical blend of powdered PTFE and powdered polycarbonate The Table I shows that formulations containing the PTFE concentrate prepared according to the invention give molded parts that are superior in physical properties. Moreover, there is practically no adverse change in properties when the PTFE level is raised from 0.24% to 0.84% in the concentrates prepared according to the invention (compare examples 1,3 with 2,4). That an additive does not adversely affect the physical property of a polymer is highly desirable. The increase in PTFE level allows achievement of the desirable UL94 SV performance (Examples 1 and 3) while preserving the good physical properties.

EXAMPLES 5–12 AND COMPARATIVE EXAMPLES A–E

The process of the invention according to Examples 1–4, supra. is repeated, using a variety of proportions of PTFE and Lexan® 125, polycarbonate, supra. The resulting admixtures of polycarbonate and PTFE were then formulated with 0.3 parts of a mold release agent and 0.05 parts of a heat stabilizer. Potassium salt of diphenylsulfone sulfonate fire retardant was added to some of the blends. Upon testing, the physical results obtained were reported in Table II, below, under Examples 5–12.

For purposes of comparison, formulations as described above were prepared, except that the PTFE was added to the polycarbonate by simply blending the PTFE latex with the powdered polycarbonate, followed by drying. In one example (comparative Example E), instead of PTFE in a latex, a dry powder of PTFE (Fluon® CD-1, ICI) was blended with a resin powder of the polycarbonate. The test results and formulations are set forth also in the Table II, below, under comparative Examples A–E.

TABLE II

|  | Examples | | | | | | | | | | | | |
| --- | --- | --- | --- | --- | --- | --- | --- | --- | --- | --- | --- | --- | --- |
| Formulation (% by wt) | Comp A | Comp B | Comp C | Comp D | Comp E | 5 | 6 | 7 | 8 | 9 | 10 | 11 | 12 |
| Lexan ®, 125 supra. | 99.61 | 98.80 | 99.61 | 99.80 | 99.61 |  |  |  |  |  |  |  |  |
| KSS, supra. |  | 0.45 |  | 0.45 |  |  | .45 |  | .45 |  |  |  |  |
| PTFE | 0.04 | 0.40 |  |  |  |  |  |  |  |  |  |  |  |
| PTFE |  |  | 0.04 | 0.40 |  |  |  |  |  |  |  |  |  |
| PTFE |  |  |  |  | 0.04 |  |  |  |  |  |  |  |  |
| SPTFE |  |  |  |  |  | 0.04 | 0.40 |  |  |  |  |  |  |
| SPTFE |  |  |  |  |  |  |  | 0.04 | 0.08 | 0.40 |  |  |  |
| SPTFE |  |  |  |  |  |  |  |  |  |  | 0.04 | 0.08 | 0.32 |
| Test Results |  |  |  |  |  |  |  |  |  |  |  |  |  |
| NI (kg/cm$^2$) 125 mil. | 1.01 | 0.35 (20)* | 1.03 | 0.32 (20)* | 0.69 (60)* | 1.00 | 1.00 | 1.08 | 0.97 | 1.03 | 0.99 | 1.05 | 1.03 |
| Dynatup (kg/cm$^2$) | 3.02 | 2.53 | 3.21 | 2.78 | 3.17 | 3.57 | 2.96 | 3.27 | 3.33 | 3.35 | 3.44 | 3.45 | 3.48 |
| Tensile Elong. (%) | 75 | 59 | 86 | 63 | 68 | 106 | 92 | 103 | 79 | 73 | 75 | 76 | 85 |

LEXAN ® 125 is 24,000 avg. Mw polycarbonate powder made by General Electric Company, Mt. Vernon, IN
PTFE Comp A, B, C & D are made by adding PTFE latex (Dupont T30 and ICI's Fluon AD1, resp.) to polycarbonate powder followed by blending and drying
PTFE comp E is powered PTFE (Fluon CD1 from ICI)
SPTFE Examples 5–12 are made by the present invention
*NI performed on ⅛" thick bars; numbers in parentheses indicate % ductility. Otherwise, 100% ductile break.
Dynatup performed on ⅛" × 4" round disc; All 100% ductile.

EXAMPLES 13–14 AND COMPARATIVE EXAMPLES F–G

These Examples described the properties obtained with the concentrate of this invention when employed with a polycarbonate resin (LEXAN® 125) and an acrylonitrile-butadine-styrene resin (ABS). The PTFE/PC concentrate employed herein is the same prepared by the process of Examples 1–4 except that the concentrate is a 20% by weight of PTFE in polycarbonate. The comparative straight blend of PTFE/polycarbonate is also a 20% by weight of PTFE and 80% by weight of polycarbonate. Test specimens are prepared and tested in accordance with the same test procedure set forth in Examples 1–12, Control Example of Table I and Comparative Examples A–E of Table II. The results obtained were reported on Table III below:

TABLE III

| | Examples | | | |
|---|---|---|---|---|
| Formulation (% by wt) | Comp F | 13 | Comp G | 14 |
| Lexan ® 125 | 79.75 | 79.75 | 77.75 | 77.75 |
| ABS | 10.5 | 10.5 | 10.5 | 10.5 |
| FR | 8.0 | 8.0 | 8.0 | 8.0 |
| PTFE/PC blend | 1.0 (0.2/0.8) | | 3.0 (0.6/2.4) | |
| SPTFE/PC concentrate | | 1.0 (0.2/0.8) | | 3.0 (0.612.4) |
| Stabilizer | 0.75 | 0.75 | 0.75 | 0.75 |
| Test Results | | | | |
| NI (ft-lb/in) | 9 | 11.5 | 8.6 | 12 |
| Dynatup (total energy ft-lb) | 33.8 | 36.3 | 31 | 39.4 |
| UL94 5VA (pass thickness mm) | 3.2 | 3.2 | 3.2 | 2.8 |
| UL94 5VB (pass thickness mm) | 2.5 | 2.3 | 2.5 | 2.3 |

LEXAN ® 125 is 24,000 avg. Mw polycarbonate powder made by General Electric Company, Mt. Vernon, In.
ABS - acrylonitrile-butadine-styrene
FR - Phosphate flame retardant by AKZO
SPTFE/PC - steam precipitated polycarbonate/PTFE per this invention
PTFE/PC - straight blend of PTFE and polycarbonate as used in Examples 1–4
Stabilizer - combination of mold release agent and UV stabilizer

EXAMPLES 15 AND COMPARATIVE EXAMPLE H

Examples 13–14 were repeated except that in place of the PC/ABS composition, a polyphenylene-ether/high impact polystyrene blend composition is employed herein.

The results obtained are reported in Table IV below:

TABLE IV

| | Examples | |
|---|---|---|
| Formulation (% by wt) | 15 | Comp H |
| PPE | 49.20 | 40.20 |
| HIPS | 25.26 | 25.26 |
| FR | 20 | 20 |
| SPTFE/PC concentrate | 1.0 (0.2/0.8) | |
| PTFE/PC blend | | 1.0 (0.2/0.8) |
| Stabilizer | 2.15 | 2.15 |
| Test Results | | |
| NI (ft-lb/in) | 5.4 | 5 |
| Dynatup (total energy ft-lb) | 37.3 | 29.7 |

PPEO - polyphenylene ether from General Electric Company
HIPS - high impact polystyrene
Stabilizer - same as on Table III except contains polyethylene
All others are the same as in Table III

EXAMPLES 16–18 AND COMPARATIVE EXAMPLES I–K

Examples 13–14 and Comparative Examples F–G were repeated except that in place of the polycarbonate/ABS system, a polybutylene terephthalate resin system was employed herein. The results obtained were reported in Table V below:

TABLE V

| Formulation | Examples | | | | | |
|---|---|---|---|---|---|---|
| (% by Wgt) | 16 | 17 | 18 | Comp I | Comp J | Comp K |
| PBT | 77.25 | 76.25 | 75.25 | 77.25 | 76.25 | 75.25 |
| FR | 20.0 | 20.0 | 20.0 | 20.0 | 20.0 | 20.0 |
| SPTFE/PC concentrate | 1 | 2 | 3 | | | |
| PTFE/PC blend | | | | 1 | 2 | 3 |
| Additive | 1.75 | 1.75 | 1.75 | 1.75 | 1.75 | 1.75 |
| Test Results | | | | | | |
| NI (ft-lb/inch) | 1 | 1 | 1 | 1 | 1.2 | 1.3 |
| ⅛" Unonotched Izod (ft-lb/inch) | 34.8 | 39.2 | 40 | 15.8 | 24.4 | 32.7 |
| % ductibility of Unotched Izod | 100 | 100 | 100 | 20 | 40 | 20 |
| Tensile Break TYPE V ⅛" | 9235 | 60440 | 116,100 | 2992 | 4114 | 34260 |

TABLE V-continued

| Formulation | Examples | | | | | |
|---|---|---|---|---|---|---|
| (% by Wgt) | 16 | 17 | 18 | Comp I | Comp J | Comp K |
| Tensile Elongation (%) TYPEV ⅛" | 150 | 165 | 178 | 63 | 121 | 138 |

PBT - VALOX ® polymer manufactured by General Electric Company, Mt. Vernon, IN
FR - Bromine epoxy antimony oxide
Additive - blend of mold release agent and UV stabilizer
All other constituents of the Formulation are the same as in Table I–IV As may be observed from Table II, above, the process of the present invention permits one to achieve high weights of additive dispersion in a polymer resin, without substantial loss of physical properties associated with the polymer. In particular, the process allows for raising the level of PTFE in a polycarbonate formulation to enhance drip inhibition performance, without sacrificing mechanical properties in articles molded from the formulations.

Note that the PTFE concentrate used in comp. B is the same as that used in the control formulation in Table I. It can be seen that the mechanical properties of these 2 formulations in Tables I and II are different. This inconsistent behavior is very typical when poorly dispersed PTFE is used in plastics formulations.

As observed from Table III, IV and V, impact resistance is increased with compositions employing the concentrate prepared by the process of this invention. Also, flame resistance is increased as shown in Table III wherein thinner sections are burned through by the UL tests (note Examples 13 and 14 vs. Comp Examples F and G for 5VB and Example 14 vs. Comp Example G for 5Va). Further, note that tensile break and tensile elongation are greatly increased.

Those skilled in the art will appreciate that many modifications may be made to the process of the invention as described above in relation to the dispersion of PTFE in a polycarbonate resin, without departing from the spirit and the scope of the invention. For example, two or more additives may be dispersed in a given resin simultaneously. In general, any additives may be so dispersed, particularly if they are capable of being carried in a solid or colloidal dispersion or as a solution for use in the process of the invention. Variables such as steam precipitation nozzle sizes, steam pressures, particle sizes, and ratios of components may all be adjusted to optimize results. The mixing of fluid streams and coprecipitation step may both be carried out at ambient temperatures and under atmospheric pressures although higher temperatures and pressures are not excluded.

It is interesting to note that the solid particles such as PTFE are individually encapsulated in the thermoplastic resin with which they have been co-precipitated. In other words, the present invention co-precipitates a particle comprised of a solid core such as PTFE and a shell of a thermoplastic resin such as polycarbonate. This concentrate may then be further blended with a thermoplastic resin which forms a continuous phase surrounding the individually encapsulated particles of solid additive. Thus, the term "individually encapsulated" refers to the particle comprised of a solid additive core and a shell of a thermoplastic resin which may or may not be further surrounded by a continuous phase resin.

What is claimed is:
1. A composition comprising:
(A) a thermoplastic polymer selected from the group consisting of polyolefins, copolymers of ethylene, copolymers of 1-olefins, polystyrene, polyvinyl halides, polyvinylidene halides, polycarbonamides, superpolyamides, polycarbonimides, polyethers, polycarbonates, polyoxyalkalenes, polyphenylene ether, modified polyphenylene ether, polyalkylene terephthalates, polyetherimide esters, polycaprolactam and polyether esters, and
(B) an additive produced by dissolving thermoplastic polymer (A) in a solvent; dispersing solid particles in a fluid; mixing the dissolved thermoplastic polymer (A) and the dispersed particles to form an admixture; simultaneously removing the solvent and the fluid from the admixture by volatilization to co-precipitate the particles and thermoplastic polymer and result in solid particles that are highly dispersed and encapsulated by said thermoplastic polymer to form layered particles having a core and a shell, the solid particles as the core, and the thermoplastic polymer as the shell, and, when the composition is melted in a further forming process, the thermoplastic polymer (A) and the shell around the core coalesce into a continuous phase.

2. The composition of claim 1, wherein said thermoplastic polymer is a polycarbonate resin.

3. The composition of claim 1, where said solid particles comprise polytetrafluoroethylene.

4. The composition of claim 1, wherein said thermoplastic polymer is selected from the group consisting of polyethylene, other polyolefins and copolymers of ethylene and 1-olefins; polystyrene; polyvinyl halides; polyvinylidene halides; linear polycarbonamides; superpolyamides; polycaprolactam; polycarbonimides; polyethers; polycarbonates; and polyoxyalkalenes.

5. The composition of claim 1, where said solid particles are selected from the group consisting of fillers; supplementary delustrants; impact modifiers; antistats agent; antioxidants; plasticizers; flow promoters and other processing aids; stabilizers; colorants; mold release agents; supplementary or synergistic flame retardants; and ultraviolet screening agents.

6. The composition according to claim 1, wherein said solid particles comprise a fluoropolymer selected from poly(vinylidene fluoride), poly(vinyl fluoride), poly(trifluoroethylene), poly(chlorotrifluoro-ethylene) and poly(trifluoroethylene alkali metal sulfonate).

7. A composition comprising:
(A) a thermoplastic polymer selected from the group consisting of polystyrene, polyvinyl halides, polyvinylidene halides, polyamides, superpolyamides, polycarbonimides, polyethers, polycarbonates, polyoxyalkalenes, polyphenylene ether, modified polyphenylene ether, polyalkylene terephthalates, polyetherimide esters, polycaprolactam, and polyether esters, and (B) an additive produced by dissolving thermoplastic polymer (A) in a solvent; dispersing solid particles in a fluid; mixing the dissolved thermoplastic polymer (A) and the dispersed particles to form an admixture; simultaneously removing the solvent and the fluid from the admixture by volatilization to co-precipitate the particles and thermoplastic polymer and result in solid particles that are highly dispersed and encapsulated by said thermoplastic polymer to form layered particles having a core and a shell, the solid particles as the core, and the thermoplastic polymer as the shell and, when the composition is melted in a further forming process, the thermoplastic polymer (A) and the shell around to core coalesce into a continuous phase.

8. The composition of claim 7, wherein said thermoplastic polymer is a polycarbonate resin.

9. The composition of claim 7, where said solid particle comprises polytetrafluoroethylene.

10. The composition of claim 7, wherein said thermoplastic polymer is selected from the group consisting of polystyrene; polyvinyl halides; polyvinylidene halides; linear polycarbonamides; superpolyamides; polycaprolactam; polycarbonimides; polyethers; polycarbonates; and polyoxyalkalenes.

11. The composition of claim 7, where said solid particles are selected from the group consisting of fillers; supplementary delustrants; impact modifiers; antistatic agents; antioxidants; plasticizers; flow promoters and other processing aids; stabilizers; colorants; mold release agents; supplementary or synergistic flame retardants; and ultraviolet screening agents.

12. The composition according to claim 7, wherein said solid particles comprise a fluoropolymer selected from poly(vinylidene fluoride), poly(vinyl fluoride), poly(trifluoroethylene), poly(chlorotrifluoro-ethylene) and poly(trifluoroethylene alkali metal sulfonate).

13. A composition comprising:

(A) a polycarbonate resin, and (B) an additive produced by dissolving polycarbonate resin (A) in a solvent; dispersing solid particles in a fluid; mixing the dissolved polycarbonate resin (A) and the dispersed particles to form an admixture; simultaneously removing the solvent and the fluid from the admixture by volatilization to co-precipitate the particles and polycarbonate resin and result in solid parables that are highly dispersed and encapsulated by said polycarbonate resin to form layered particles having a core and a shell, the solid particles as the core, and the polycarbonate resin as the shell and, when the composition is melted in a further forming process, the polycarbonate resin (A) and the shell around to core coalesce into a continuous phase.

14. The composition of claim 13, where said solid particles comprise polytetrafluoroethylene.

15. The composition of claim 13, where said solid particles are selected from the group consisting of fillers; supplementary delustrants; impact modifiers; antistatic agent; antioxidants; plasticizers; flow promoters and other processing aids; stabilizers; colorants; mold release agents; supplementary or synergistic flame retardants; and ultraviolet screening agents.

16. The composition according to claim 13, wherein said solid particles comprise a fluoropolymer selected from poly(vinylidene fluoride), poly(vinyl fluoride), poly(trifluoroethylene), poly(chlorotrifluoro-ethylene) and poly(trifluoroethylene alkali metal sulfonate).

* * * * *